Feb. 15, 1949.   G. D. ARMERDING   2,461,623
VISUAL OBSERVATION AND SILHOUETTE
PROJECTION APPARATUS
Filed April 22, 1944   3 Sheets-Sheet 1
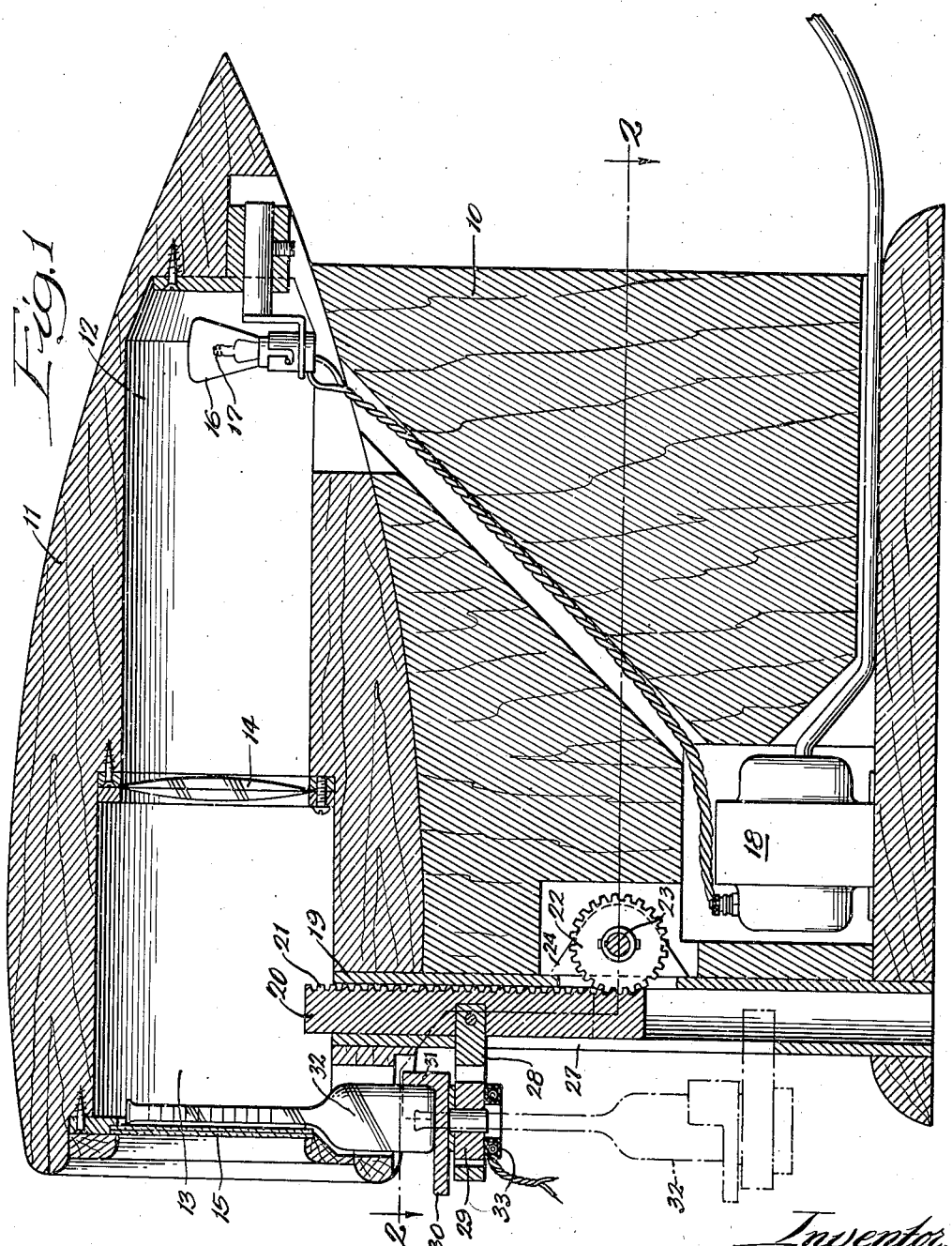
Inventor.
George D. Armerding,
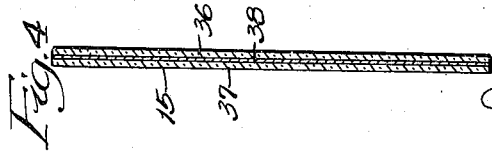
Attorneys.

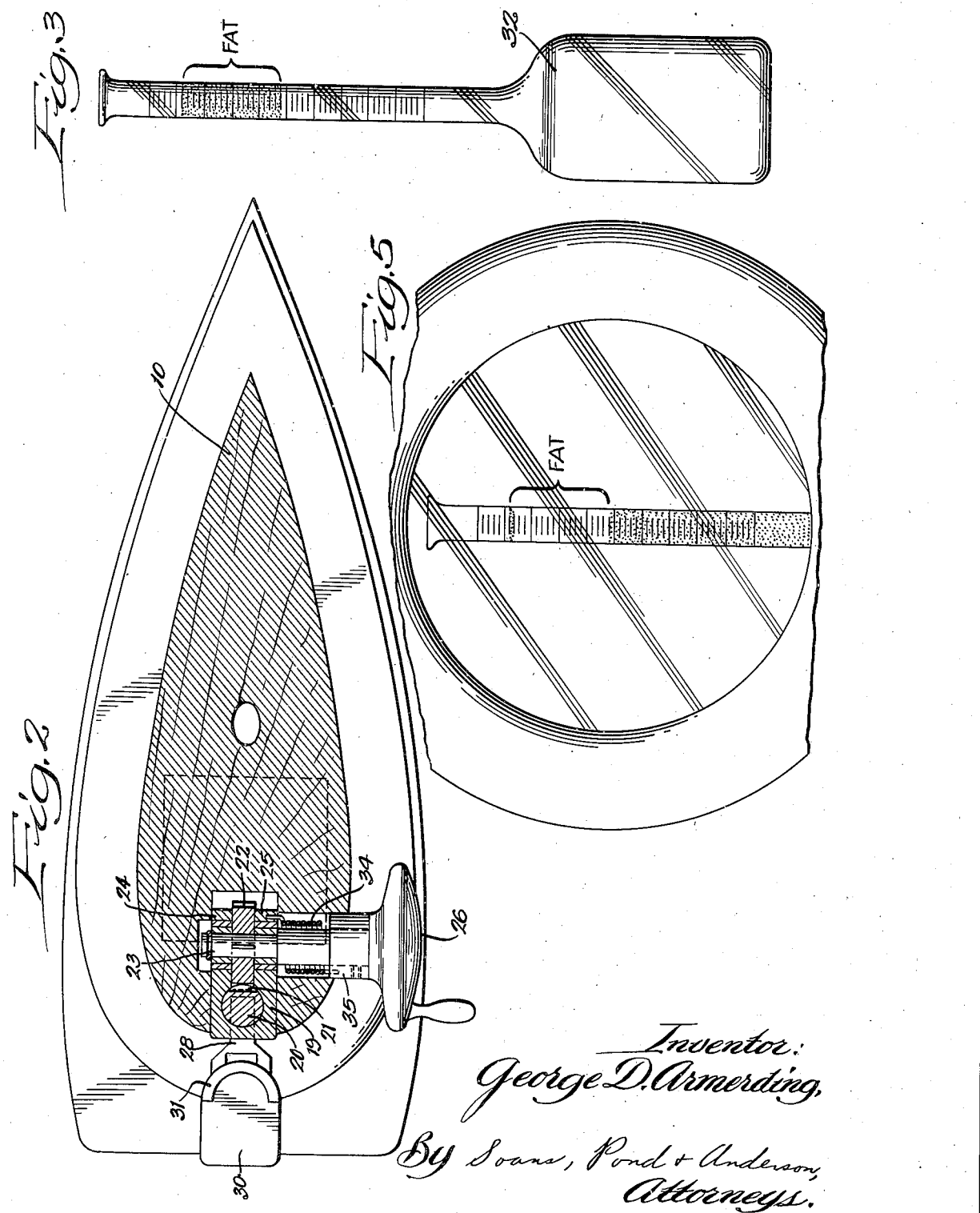

Feb. 15, 1949.　　　G. D. ARMERDING　　　2,461,623
VISUAL OBSERVATION AND SILHOUETTE
PROJECTION APPARATUS
Filed April 22, 1944　　　　　　　　　　3 Sheets-Sheet 3
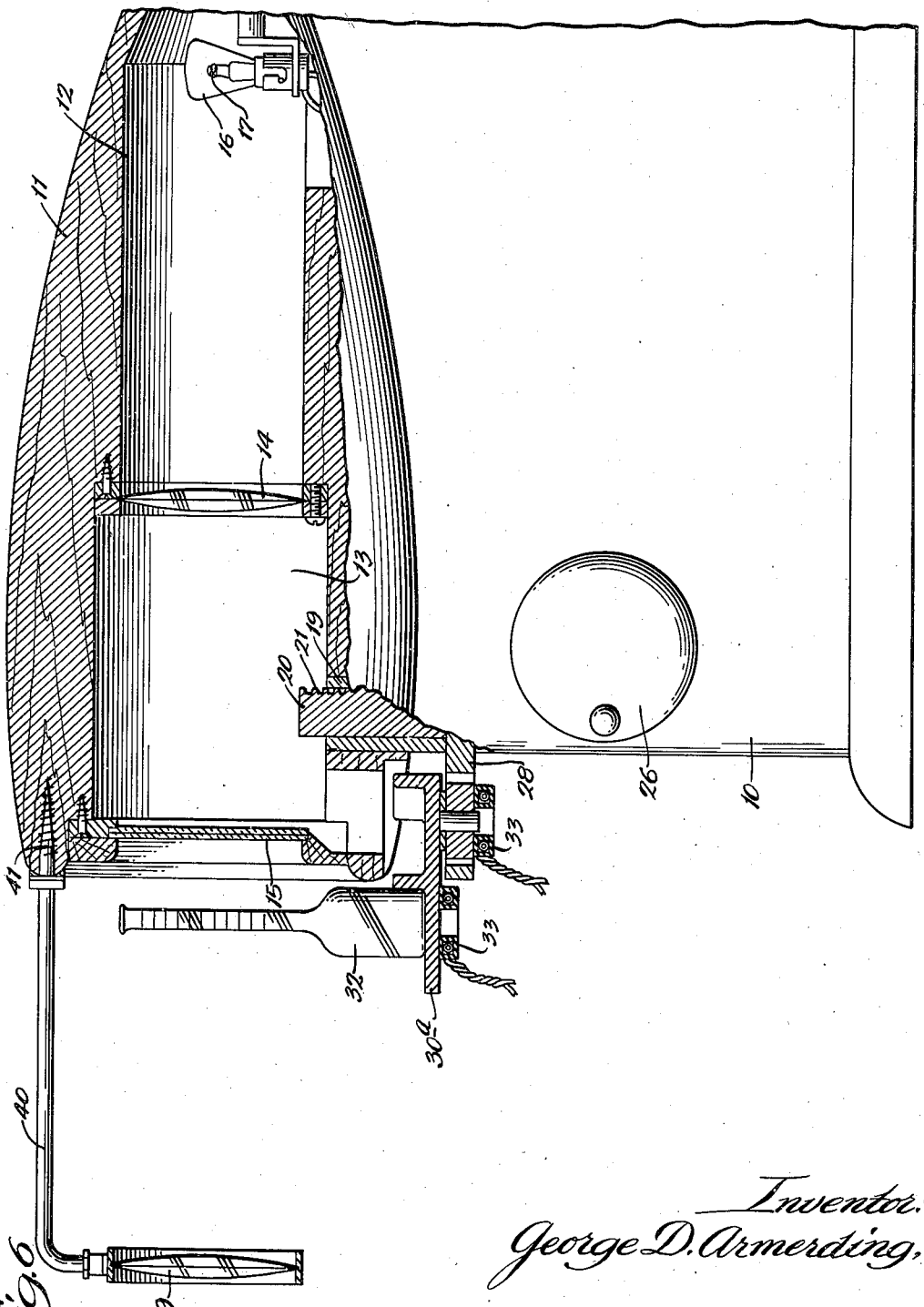
Inventor:
George D. Armerding,
By Soans, Pond & Anderson
Attorneys.

Patented Feb. 15, 1949

2,461,623

UNITED STATES PATENT OFFICE 2,461,623

VISUAL OBSERVATION AND SILHOUETTE PROJECTION APPARATUS

George D. Armerding, Oak Park, Ill., assignor to Mojonnier Bros. Co., a corporation of Illinois Application April 22, 1944, Serial No. 532,294

7 Claims. (Cl. 88—24)

1

My invention relates to improvements in equipment for improving the accuracy of visual observations and is of particular value in connection with observing the height or volume of fluids contained in graduated tubes or cylinders. For example, the invention is particularly well suited to improving the accuracy of the measurement or reading of the graduated tubular stem of a bottle or flask employed in the determination of the fat content of milk according to the Babcock tester and technique.

According to the Babcock method of testing the fat content of milk, a definite quantity or weight of the milk to be tested is introduced into a flask. A supply of acid, usually sulfuric acid, is also introduced and mixed with the milk for the purpose of dissolving the solid constituents other than milk fat. Enough water is added to bring the level of liquid to a suitable point in the length of the long, relatively small diameter, tubular stem or neck of the flask, this neck or tube having been graduated with a scale the divisions of which are so spaced that, based upon the standard quantity of milk introduced into the flask, a fat content of $\frac{1}{10}$ of 1% will be represented by a column of liquid of a height equal to the distance between two adjacent graduations.

The flask and its contents which are then at a temperature of about 135° F. are then spun in the usual manner in a centrifuge with the flask body disposed outwardly and with the stem of the flask extending radially inwardly towards the center. As a result of this process, the milk fat which is liquid at temperatures above 95° F. is concentrated at the inner end of the tube of the flask so that, when the flask at the conclusion of the spinning operation is removed from the apparatus, the fat appears as a plug of transparent liquid at the top of the column.

In order to read accurately the amount of liquid fat in the stem of the flask, it is necessary to use extreme care not only in holding the flask vertical but particularly in positioning the eye of the observer in horizontal planes intersecting the observation points at the top and bottom of the fat column. In the standard Babcock milk tester flask, the graduations are usually only about $\frac{1}{10}$ of an inch apart, and hence it will be seen that an error of $\frac{1}{30}$ of an inch in reading the height of the column would represent an error of $\frac{1}{30}$ of 1%. At present milk and milk fat prices, this would represent about 8¢ on each 100 lbs. of milk supplied by the farmer. Therefore, the im-

2 portance of obtaining an extremely accurate reading in a case of this sort is obvious.

The principal object of the invention is to provide an arrangement or method by the use of which the possibility of error in reading a metering device, principally arising through faulty sighting, may be eliminated or reduced to a minimum. Other objects of the invention are to facilitate the making of a permanent record of each individual observation or reading, without dependence upon any of the human faculties, thereby eliminating any possibility of mistake due to personal idiosyncrasies of the observer.

According to the general method which has been found to be useful in practicing the invention, there is provided a beam of parallel rays, preferably light rays, which are directed upon the metering device, the latter being placed adjacent a diaphragm which receives in effect a silhouette or image of the metering device. The diaphragm is made of such material as to permit a certain percentage of the light rays to pass through the same so that, when the diaphragm is viewed from the side opposite the metering device, the diaphragm or screen will exhibit in effect a silhouette of the metering device. Said silhouette can be viewed or observed from the back or non-illuminated face of the diaphragm at any reasonable angle without any inaccuracy or variation due to parallax or other optical difficulties. If desired, a permanent record may be made by photographing the image of the silhouette on the diaphragm.

In illustrating one application of my invention, I have selected, as a preferred embodiment, an apparatus arranged to improve the accuracy of the usual Babcock milk test. Said apparatus is shown in the accompanying drawings in which:

Fig. 1 is a vertical section through the apparatus as a whole;

Fig. 2 is a section taken on the line 2—2 of Fig. 1;

Fig. 3 is an elevation of a Babcock milk testing flask containing contents including a fat column in condition to be measured;

Fig. 4 is an enlarged cross section of the screen or diaphragm element;

Fig. 5 shows the appearance of the image or silhouette of a milk sample under test, when the back face of the diaphragm is viewed from the exterior of the casing; and Fig. 6 is an elevation of a modification of the apparatus shown in Fig. 1.

Referring to the drawings, it will be observed that the apparatus is mounted on a sturdy wooden base 10 upon which there is positioned a circular bullet-shaped casing 11, the interior of which is bored out so as to provide an inner bore 12 of minor diameter and an outer bore 13 of major diameter. The open or outer end of the bore 13 is fitted with a translucent screen or diaphragm element 15, and the opposite end of the bore 12 is equipped with a light source which takes the form of an automobile-type head lamp bulb 16, the filament 17 of which is located in the axis of the casing at the focal point of the condensing lens 14, so that the rays of light emanating from said filament 17 and striking the lens 14 will be condensed into a beam of parallel rays, said beam having a cross section substantially equal to the area of the lens 14 and diaphragm element 15.

The filament 17 of the head lamp bulb 16 is energized by a step-down transformer 18 of a type similar to that used for ringing bells, and connected to the usual 110 volt alternating current electric power supply. Suitable mechanical arrangements are employed, as indicated, for positioning the filament 17 in the axis of the projector and at the correct focal distance from the lens 14.

At the left-hand end of the apparatus, as shown best in Fig. 1, there is provided a vertically arranged hollow guideway 19, which is bored out to form a circular vertically extending passageway in which slides a cylindrical plunger 20, on one side of which there are formed rack teeth 21. Said rack teeth are engaged by the teeth of a spur gear or rack gear 22, mounted on a horizontally extending shaft 23, journalled in spaced ears 24 and 25 formed as integral extensions approaching inwardly from the plunger casing 19. Said lugs or parts 24 and 25 are spaced the proper distance apart to receive between them the rack pinion 22.

The shaft 23 at one end thereof is extended outwardly beyond the casing and is equipped with a hand wheel 26, so that, when the hand wheel 26 is actuated, the plunger 20 will be moved vertically within the guideway 19. The guideway 19 is provided with an outwardly facing slot 27 adapted to slidably receive the neck 28 of a platform or support 29. Said neck 28 is rigidly secured in the plunger 20, and hence the platform or support 29 partakes of the vertical movement imparted to the plunger 20.

On the upper side of the platform 29, there is placed a gaging or positioning element for positively locating the position of the metering device relative to the diaphragm 15. In the present instance, said gaging element takes the form of a plate 30 the back of which is formed with a semicircular, vertically extending flange element 31 of the proper dimensions to receive the cylindrical base 32 of the test flask.

Preferably, for the purpose of maintaining the temperature of the flask and its contents, usually at about 135° F., some means are provided for supplying artificial heat at the base of the flask. In the present instance, I have indicated a heating element 33 placed under the platform 29, although any desired type of heating arrangement can be employed. In some cases the heat from the beam of light rays in the casing can be utilized in whole or in part to supply heat for this purpose.

Since the platform 29, base 30 and bottle 32 are of considerable weight, it is advisable to provide some way of counterbalancing said weight in order to maintain the plunger in its up position while the reading is being taken. Such counterbalancing effect may be provided by using a torsion spring such as is indicated at 34 in Fig. 2, one end of said spring being anchored in the lug 25 and the other end of said spring being anchored in the hub 35 of the hand wheel 26.

The diaphragm or screen for receiving or displaying the silhouette or image of the metering device should be made of such material that a considerable portion of the light rays will pass through the diaphragm without causing glare or any other dazzling effect which would tire the eyes of an observer who may be required to test a great many samples of milk within a short period of time. Although many materials can be used for this purpose with some degree of success, I have had the best results with a diaphragm or screen element in which there are two sheets of flat optical glass 36 and 37, for example cover glass, one of which is coated with a film 38 of metallic pigment having an extremely fine grain, the other sheet serving to protect said film.

When a transparent, cylindrical, graduated glass tube is positioned in the manner described, and as shown in Figures 1 and 2, the tube will act as a cylindrical lens and will focus or project an image of the graduated tube and its contents onto the adjacent surface of the diaphragm or screen 15, which image can be viewed from the opposite side of the screen. Parallax effects, which cause so much difficulty in accurately reading the height of such columns, are thereby eliminated, and in addition the image can be made wider than the tube by proper relative positioning of the tube and the screen.

In view of the fact that extraneous, non-parallel light rays should be eliminated as far as possible, it is advisable to coat with lamp black all interior surfaces of the projector casing and the bores 12 and 13, with the exception of the diaphragm 15 and the lens 14.

In Fig. 6, I have illustrated a slightly modified arrangement which will enable the flask, or other metering device, to be supported adjacent the diaphragm on the outside of the casing, instead of inside the casing as shown in Fig. 1. To this end, the platform, or support 30, is made with an extension 30ª for supporting the flask with its axis vertical and at the required elevation to bring the graduations within the observation field. In such case, it is advisable to equip the apparatus with a magnifying glass 39, which may be of the same general type and size as the condensing lens 14. Said magnifying glass 39 is arranged with its axis in line with the axis of the lens 14 and is supported by an arm, or bracket, 40, fixed in the upper part of the casing, as shown on 41.

I claim:

1. Observation equipment for facilitating accurate visual reading of a metering device, comprising, in combination, means including a light source and a lens for producing a beam of substantially parallel light rays of sufficient cross-sectional area to include the desired zone of observation, a diaphragm having a face acted on and illuminated by said beam and disposed in a plane perpendicular to said beam for displaying a silhouette or image of a metering device disposed in said beam adjacent the illuminated face of said diaphragm and having the capacity of transmitting sufficient light to enable such silhouette or image to be observed and the reading obtained when viewed from the non-illuminated face of said diaphragm, means for supporting said metering device closely adjacent the face of said diaphragm which is illuminated by said light beam, and heater means for maintaining the metering device at a predetermined elevated temperature during the use of said equipment.

2. Observation equipment for facilitating accurate visual reading of the height of liquid in a transparent, cylindrical graduated tube, comprising, in combination with said tube, an elongated casing which is open at one end thereof, means including a source of light and a lens for producing a beam of substantially parallel light rays which is directed through said casing toward the open end thereof, said light beam being of sufficient cross sectional area to include the desired zone of the graduations on said tube, a translucent diaphragm covering the said open end of said casing, said diaphragm being disposed in the path of said beam in a plane perpendicular to said rays for displaying an image of the tube and its contents when disposed in said beam and having the capacity of transmitting sufficient light to enable such image to be observed and the reading obtained when viewed from the non-illuminated face of said diaphragm, means for supporting said tube closely adjacent the illuminated face of said diaphragm and in the path of said beam, whereby said tube will act as a cylindrical lens to project an image of said graduated tube and its contents onto the adjacent side of said diaphragm, and heater means for maintaining said tube at a predetermined elevated temperature during the use of said equipment.

3. Apparatus for facilitating the visual reading of the graduated, fat measuring column in the stem of a Babcock milk testing flask, comprising a horizontally disposed, elongated hollow casing which is open at one end thereof, the said open end of said casing being of sufficient cross sectional area to contain at least the stem portion of a vertically disposed Babcock flask, a translucent diaphragm covering the said open end of said casing, means including a source of light and a lens for producing a beam of substantially parallel light rays which is directed along the longitudinal axis of said casing and which illuminates said translucent diaphragm, means including a platform, a vertical guideway, a platform support member movable in said guideway, and gearing means for supporting a Babcock testing flask for movement from a position outside said casing to a position within said casing where the graduated column of such flask will be disposed closely adjacent said diaphragm, whereby said tube will act as a cylindrical lens to project an image of said column, visible from the outside of said casing, on said diaphragm, and heater means integral with said flask support means for maintaining said flask and its contents at a predetermined elevated temperature during the use of said apparatus.

4. Apparatus for facilitating the visual reading of the graduated, fat measuring column in the stem of a Babcock milk testing flask, comprising a horizontally disposed, elongated, hollow casing which is open at one end thereof, the said open end of said casing being of sufficient cross-sectional area to contain at least the stem portion of a vertically disposed Babcock flask, a translucent diaphragm covering the said open end of said casing, means including a source of light and a lens for producing a beam of substantially parallel light rays which is directed along the longitudinal axis of said casing onto said translucent diaphragm, means including a platform, a vertical guideway, a platform support member movable in said guideway, gearing means and counter-balancing means for said platform for supporting a Babcock testing flask for movement from a position outside said casing to position within said casing where the graduated column of said flask will be disposed closely adjacent to said diaphragm, whereby said tube will act as a cylindrical lens to project an image of said column, visible from the outside of said diaphragm and casing, onto said diaphragm, and an electrical heater means integral with said platform for maintaining said flask and its contents at a predetermined elevated temperature during the use of said apparatus, said platform including gauging means for accurately positioning said flask thereon.

5. Observation equipment for facilitating accurate visual reading of the height of liquid in a transparent, cylindrical, graduated tube, comprising, in combination with said tube, an elongated casing which is open at one end thereof, means including a source of light and a lens for producing a beam of substantially parallel light rays which is directed through said casing toward the open end thereof, said light beam being of sufficient cross-sectional area to include the desired zone of the graduations on said tube, a translucent diaphragm covering the open end of said casing, said diaphragm being disposed in the path of said beam for displaying an image of the tube and its contents when said tube is disposed in said beam, said diaphragm having the capacity of transmitting sufficient light to enable such image to be observed and the reading obtained when viewed from the non-illuminated face of said diaphragm, and support means including a vertically movable platform for supporting said tube for movement from a lowered position outside said casing to an elevated position within said casing, said platform support including a gauging means for accurately positioning said tube relative to said diaphragm, when said platform support is in said elevated position, whereby said tube will act as a cylindrical lens to project an image of said graduated tube and the liquid column contained therein onto the adjacent side of said diaphragm.

6. Apparatus for facilitating the visual reading of the graduated, fat measuring column in the stem of a Babcock milk testing flask, comprising a horizontally disposed, elongated, hollow casing which is open at one end thereof, the said open end of said casing being of sufficient cross-sectional area to contain at least the stem portion of a vertically disposed Babcock flask, a translucent diaphragm covering the said open end of said casing, means including a source of light and a lens for producing a beam of substantially parallel light rays which is directed along the longitudinal axis of said casing and which illuminates said translucent diaphragm, and means including a platform, a vertical guideway, a platform support member movable in said guideway, gearing means, and counterbalancing means for supporting a Babcock testing flask for movement from a lowered position outside said casing to an elevated position in which the stem of said flask is within said casing, said platform including gauging means for accurately positioning said flask thereon, whereby the graduated column of said flask will be disposed closely adjacent said diaphragm, when said flask is in said elevated position, and will act as a cylindrical lens to project an image of said column, visible from the outside of said casing, on said diaphragm.

7. Apparatus for facilitating the visual reading of the graduated, fat measuring column in the stem of a Babcock milk testing flask, comprising a horizontally disposed, elongated, hollow casing which is open at one end thereof, the said open end of said casing being of sufficient cross-sectional area to contain at least the stem portion of a vertically disposed Babcock flask, a translucent diaphragm covering the said open end of said casing, means including a source of light and a lens for producing a beam of substantially parallel light rays which is directed along the longitudinal axis of said casing and which illuminates said translucent diaphragm, means including a platform, a vertical guideway, and a platform support member movable in said guideway for supporting a Babcock testing flask for movement from a lowered position outside said casing to an elevated position in which the stem of said flask is within said casing, said platform member including gauging means for accurately positioning said flask thereon, whereby the graduated column of such flask will be disposed closely adjacent said diaphragm, when said flask is in said elevated position, and will act as a cylindrical lens to project an image of said column, visible from the outside of said casing, on said diaphragm, and heater means for maintaining said flask at a predetermined, elevated temperature during the use of said apparatus.

GEORGE D. ARMERDING.

REFERENCES CITED

The following references are of record in the file of this patent:

UNITED STATES PATENTS

| Number | Name | Date |
|---|---|---|
| 1,204,401 | Brixey | Nov. 14, 1916 |
| 1,228,685 | Magowan | June 5, 1917 |
| 1,315,446 | Willmarth | Sept. 9, 1919 |
| 1,737,126 | Reyling et al. | Nov. 26, 1929 |
| 1,740,130 | Voss et al. | Dec. 17, 1929 |
| 1,893,421 | Latsko et al. | Jan. 3, 1933 |
| 1,899,886 | Stines et al. | Feb. 28, 1933 |
| 1,976,783 | Harding | Oct. 16, 1934 |
| 2,131,039 | Draeger | Sept. 27, 1938 |
| 2,245,970 | Frantz | June 17, 1941 |
| 2,273,591 | Powell | Feb. 17, 1942 |